United States Patent
Sanford

[15] 3,677,150
[45] July 18, 1972

[54] SENSITOMETER LIGHT SOURCE APPARATUS

[72] Inventor: Lloyd Clifford Sanford, Acton, Mass.
[73] Assignee: Itek Corporation, Lexington, Mass.
[22] Filed: Oct. 2, 1970
[21] Appl. No.: 77,466

[52] U.S. Cl. ............................................95/10 R, 356/202
[51] Int. Cl. ...........................................................G01j 1/52
[58] Field of Search..................356/202, 204, 175; 95/10 A; 355/70; 240/6

[56] References Cited

UNITED STATES PATENTS

| | | | |
|---|---|---|---|
| 3,440,935 | 4/1969 | Sanford | 95/1 |
| 2,530,843 | 11/1950 | Smith | 355/70 |
| 3,028,483 | 4/1962 | Simmon | 355/70 X |
| 2,211,258 | 8/1940 | Delfel | 240/6 |
| 3,537,789 | 11/1970 | Tutomu Kimura | 355/32 |

*Primary Examiner*—John M. Horan
*Assistant Examiner*—Kenneth C. Hutchison
*Attorney*—Homer O. Blair, Robert L. Nathans and William C. Roch

[57] ABSTRACT

An exposure source unit for a sensitometer. The exposure source unit provides in a single structure the combination of a flash lamp, a photographic density wedge, and a plurality of radiation paths from the flash lamp to an exposure plane in which the photographic density wedge is located. The exposure source unit is constructed to provide substantially uniform radiation over the entire area of the exposure plane. In first and second embodiments, a flash lamp is located adjacent to one end of the exposure source unit, and the exposure source unit presents a plurality of folded optical paths to the exposure plane. The folded optical paths prevent radiation from directly striking the exposure plane. The cross sectional area of the exposure source unit increases as the distance from the flash lamp increases. The internal walls of the unit are formed of highly reflective, light scattering surfaces so that light is thoroughly scattered before reaching the exposure plane. In a third embodiment, the exposure source unit is constructed of clear plastic and is shaped so radiation from the lamp is selectively internally reflected within the unit and selectively transmitted from the unit to provide substantially uniform radiation over the entire area of the exposure plane.

19 Claims, 7 Drawing Figures

LLOYD C. SANFORD
INVENTOR.

BY William C. Rich

ATTORNEY.

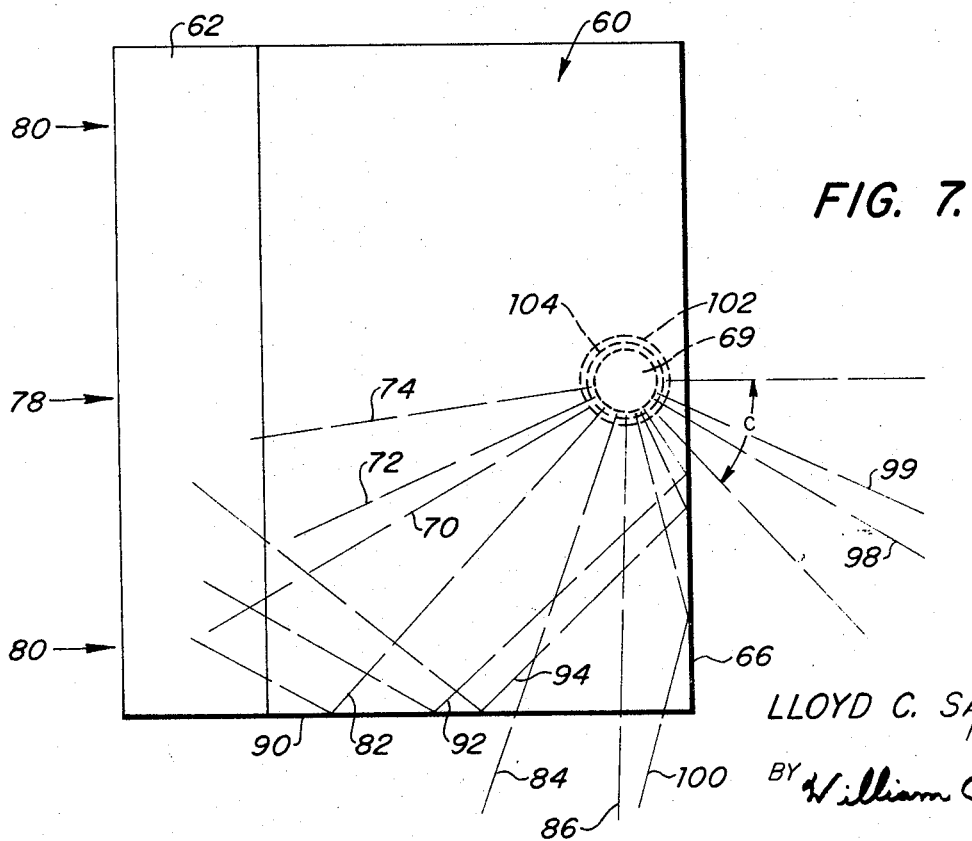

SENSITOMETER LIGHT SOURCE APPARATUS

BACKGROUND OF THE INVENTION

The present invention relates generally to the field of sensitometry, and more particularly pertains to a new and improved exposure source unit for a sensitometer wherein the exposure source unit is constructed to provide substantially uniform radiation over the entire area of the exposure plane of the sensitometer.

In the photographic field it is desirable to know the response of photographic material to illumination. The response of a photographic material to illumination may be measured by successive utilization of a sensitometer and densitometer. A sensitometer is an instrument which subjects a photographic medium to a plurality of different precise levels of exposure. Photographic exposure is the product of illumination intensity and time (E = IT), and exposure may be varied by altering either time or intensity within normal bounds. Sensitometers may be classified as time scale or intensity scale sensitometers depending upon which parameter is varied. Alternatively, both parameters might be varied in a hybrid type of sensitometer. In one embodiment of an intensity scale sensitometer, light is directed through a photographic density wedge, which varies the amount of light it transmits along its length, to a photosensitive medium which is located along the length of the photographic density wedge. After the photographic medium is developed, it will have a plurality of different densities along its length corresponding to the different levels of exposure to which it was subjected. The different densities of the medium along its length are measured in a second instrument called a densitometer. The densitometer scans the photographic medium to determine the density levels of the medium, which are indicative of the response of the medium to the different levels of exposure which the medium was subjected to in the sensitometer.

In the field of sensitometry, it has been the general practice to provide a sensitometer wherein all of the components within the sensitometer are replaceable. The flash lamp or lamps and the illumination modulator, which may be a photographic density wedge, have been removable so that they may be selectively replaced. This arrangement has been unsatisfactory in that a sensitometer is a highly-sensitive instrument which is often used by relatively unskilled personnel. After the replacement of any component of a sensitometer, the instrument must be recalibrated to obtain accurate exposure data. Unskilled personnel would often replace components within the sensitometer without recalibrating the instrument, thereby resulting in many erroneous readings, much wasted time, and added expense. A prior art sensitometer of this type is disclosed in U.S. Pat. No. 3,440,935 for a SENSITOMETER, issued to L. C. Sanford. U.S. Pat. application Ser. No. 717,870, for SENSITOMETER APPARATUS, filed April 1, 1968, by L. C. Sanford, discloses an improvement in sensitometric apparatus. In that invention, all of the components within the sensitometer which effect the calibration of the instrument are provided in a singular disposable unit. This improvement prevents field personnel from replacing critical components in the sensitometer, thereby possibly rendering the unit out of calibration. The present invention provided three embodiments of an exposure source unit which have been satisfactory in providing substantially uniform illumination over the exposure plane of a sensitometer.

SUMMARY OF THE INVENTION

This invention provides several embodiments of apparatus designed to provide substantially uniform illumination over the entire area of an output plane. More particularly, this invention provides an exposure source unit, for a sensitometer, which provides substantially uniform illumination over the exposure plane of the sensitometer. Each of the disclosed embodiments utilizes a single flash lamp, although a single lamp is not absolutely necessary. There are many advantages to the use of a single lamp in a sensitometer. In order to obtain uniform illumination over the entire area of the exposure plane, the inverse square law, which dictates the fall-off of the intensity of illumination over a distance, has to be compensated for. If multiple lamps are used, the fall-off of the intensity of radiation must be compensated for each of the lamps, thus compounding the problem. Further, a single flash lamp enables a reduction in the number of electrical components which are required to operate the sensitometer. A reduction in the number of electrical components means that there is less likelihood that one of the components will fail, thus rendering the sensitometer susceptible to erroneous exposures. Further, it is not always easy to detect the failure of one lamp or the failure of a component of an electrical subsystem activating an associated lamp when multiple flash lamps are used. Thus, if one component in a multi-lamp system fails, many erroneous sensitometric exposures may be taken before the failure is discovered. The advantage of a single lamp system over these prior art systems is obvious, as the failure of a component in the system is readily ascertainable since the sensitometer will not have an illumination output.

In first and second embodiments of the invention, illumination from a flash lamp is directed to a photographic density wedge, located in the exposure plane, over a plurality of folded optical paths. Illumination is directed to the photographic density wedge by a housing having interior walls which have highly reflective and non-specular surfaces. These non-specular surfaces ensure that the light is thoroughly scattered before reaching the exposure plane. The scattering results in substantial mixing of the light, which appears at the exposure plane as diffuse illumination. This combination of the folded optical paths and the highly reflective and non-specular surfaces provides substantially uniform radiation over the entire area of the exposure plane.

In a third embodiment of the invention, a single flash lamp is positioned in a piece of light transmissive material. The geometrical construction of the piece is such that selective internal reflection of some rays of light and selective external transmittance of other rays of light allows the inverse square law to be generally compensated for, thereby providing substantially uniform illumination over the area of the exposure plane.

BRIEF DESCRIPTION OF THE DRAWINGS

FIG. 3 is an enlarged cross sectional view of the material used to construct the first embodiment of the invention.

FIGS. 4 and 5 are respectively top and front views of first and second embodiments of this invention.

FIGS. 6 and 7 are respectively side and top views of a third embodiment of this invention.

DETAILED DESCRIPTION OF PREFERRED EMBODIMENTS

Figure 1:
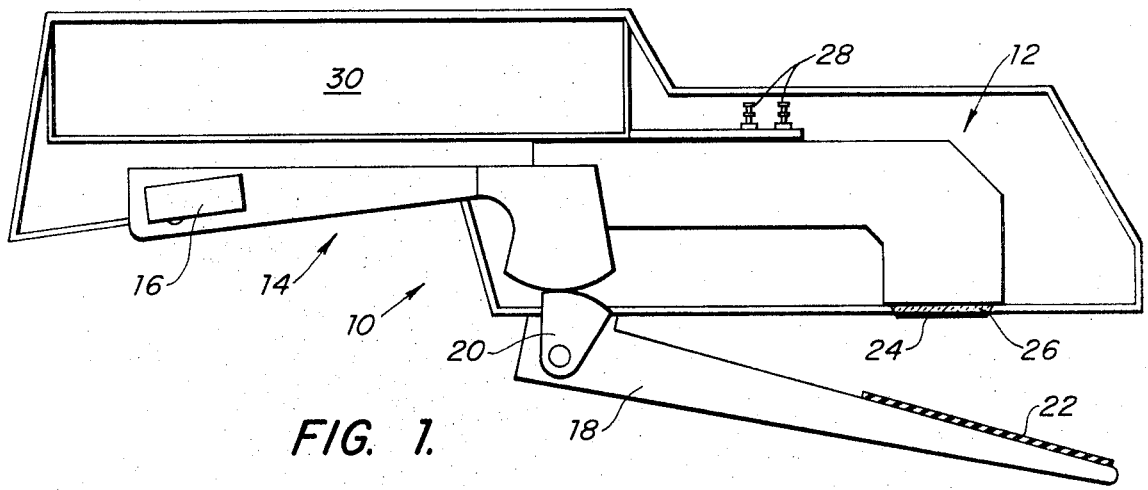
FIG. 1 illustrates a sensitometer in which the exposure source unit of this invention may be utilized.

Referring to FIG. 1, there is disclosed a sensitometer 10 which might utilize the exposure source unit 12 of this invention. Sensitometer 10 has a handle 14 which an operator grasps while utilizing the sensitometer. A trigger 16 is provided to activate the sensitometer. The sensitometer has a pivotal arm 18 which pivots from support 20 and which is automatically closed when trigger 16 is activated. Pivotal arm 18 has a soft pressure pad 22 which presses a photographic medium 24 over a photographic density step wedge 26 which is located in the exposure plane of the sensitometer. In use, a photographic material 24, the response characteristics of which are being measured, is placed in the exposure plane over photographic density step wedge 26. Pivotal arm 18 is closed against the main body of the sensitometer by squeezing trigger 16, thus holding the photosensitive medium snugly against the density step wedge. A switch is then actuated by trigger 16 to subject the photosensitive medium to predetermined different levels of exposure. Exposure source unit 12 is releasably secured in the sensitometer, and has electrical connections 28 which connect the exposure source unit 12 to the remaining electronic components 30 within the instrument. Exposure source unit 12 is a precalibrated unit and is generally good for only a given number of sensitometric exposures, after which the flash lamp or lamps have deteriorated to a point at which the calibration of the exposure source unit can no longer be trusted. At that point, the exposure unit 12 is removed from the sensitometer, disposed of, and a new precalibrated exposure source unit is inserted in the sensitometer. The sensitometer is then set for another given number of sensitometric exposures.

Figure 2:
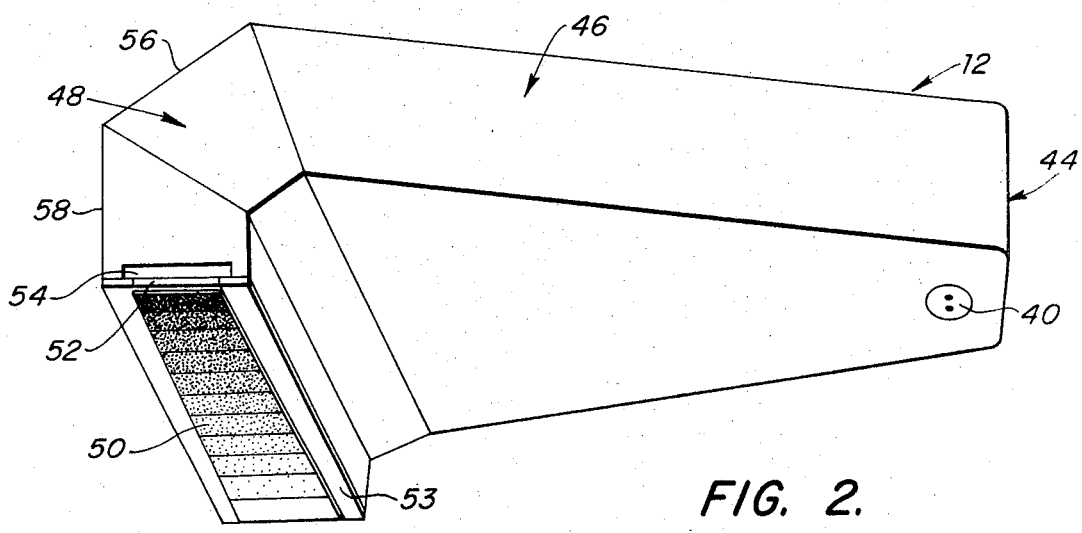
FIG. 2 illustrates a bottom perspective view of first and second embodiments of the invention.
Figure 4:
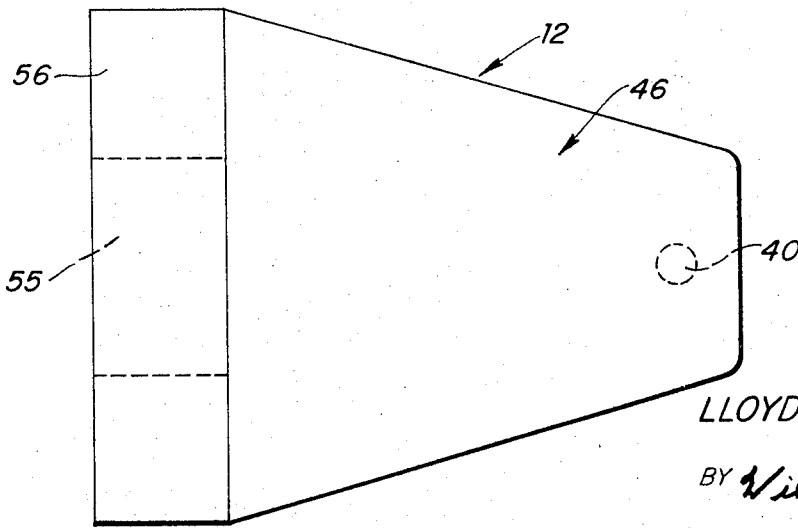

FIG. 2 illustrates a bottom perspective view of first and second embodiments of the invention. The general shape and operation of the first and second embodiments are very similar, but the embodiments differ in the material of which the exposure source units are constructed. In a first embodiment of the exposure source unit 12, lamp 40 is mounted near one end 44 of housing 46. Lamp 40 may be irreplaceably mounted in housing 46 with an epoxy cement. A photographic density wedge 50 is irreplaceably mounted at the other end of the housing. The exterior surface of density wedge 50 forms an exposure plane, in which the film being tested is exposed. Photographic density wedge 50 is utilized to modulate the illumination intensity. Density wedge 50 might be replaced by other modulating components, known in the art, which also accomplish this function. Housing 46 is folded at 48 to preclude light from lamp 40 from directly striking the exposure plan. It should be noted that the thickness of the housing is preferably constant around fold 48 to efficiently transfer radiation to the exposure plane. The width of the housing increases as the distance from the flash lamp increases to provide the housing with a diverging shape. This shape assists the uniform propagation of light from lamp 40 to the exposure plane. As lamp 52 is flashed, light is reflected internally of the housing along many folded optical paths around the bend 48 of the housing to photographic density wedge 50. Photographic density wedge 50 is irremovably attached, such as by an optically clear cement, to an optically clear window 52 which is surrounded by an opaque mask 53, which is in turn securely fastened to housing 46. In a first embodiment, the walls of housing 46, and in particular the internal walls, are formed of surfaces which are highly reflective and non-specular. Non-specular surfaces are used to thoroughly scatter the light. A type of material which has been found satisfactory is Alumalite, which is shot-peened, bright dipped, anodized aluminum sheeting. The surface of Alumalite has minute dimples formed therein which are highly specular but which scatter light efficiently so that light at the exposure plane appears as diffuse illumination. FIG. 3 shows an enlarged cross sectional view of a satisfactory material from which the walls of the housing may be constructed. The material has a highly reflective surface with a plurality of irregularly positioned dimples which effectively scatter incident light in many directions. This type of internal surface ensures that light from lamp 40 is thoroughly and efficiently scattered before encountering the exposure plane. Alumalite is a particularly good material as it has good spectral broad-band reflectivity characteristics. The combination of the plurality of folded optical paths, the lack of direct illumination falling on the exposure plane, and the internal surfaces of the housing all combine to highly scatter the illumination before it reaches the exposure plane. A slot 54 is positioned above density wedge 50 to provide a receptacle for different filters which may be desired to alter the spectral content of the illumination from flash lamp 40, or to simply reduce the intensity thereof. FIGS. 4 and 5 are respectively top and front views of the housing which more clearly show its exact shape. FIG. 4 and 5 also illustrate a T-shaped piece 55 which has been fastened to the interior of walls 56 and 58 of the housing. It has been found that, in spite of the highly diffusing nature of the interior surfaces, slightly more illumination is directed against the center of photographic density wedge 50 than the ends thereof. The T-shaped piece 55 is constructed of a radiation absorptive material, and compensates for this slight central hump in radiation by absorbing a slight amount of radiation in the center of the exposure source unit. The T-shaped piece has been successfully fabricated of shot-peened, etched, anodized aluminum.

In a second embodiment housing 46 is formed of a solid piece of light transmissive material, such as clear acrylic plastic. The exterior walls of the acrylic piece are dimpled, in a fashion similar to the shot-peened aluminum surface, and the exterior walls are coated with a highly reflective finish, thus duplicating the effect of the shot-peened, bright dipped, anodized aluminum surface. Such a housing might be formed by molding clear acrylic plastic in a mold formed by the housing of the first embodiment, and then coating the molded acrylic block with a highly reflective finish. The advantages of the solid housing are that the unit may be manufactured very cheaply by molding, and the critical components (lamp 52 and photographic density wedge 51) may be molded as integral parts of the body, thus more effectively preventing their replacement. In the second embodiment, the effect of the T-shaped piece 55 may be duplicated by coating the area normally covered by piece 55 with a less reflective exterior finish or by changing the characteristics of the dimpled surface in that area.

The mode of operation of the first and second embodiments, just described, allows the flash lamp 40 to be replaced by a plurality of lamps with little or no problems with illumination distribution over the exposure plane.

FIGS. 6 and 7 illustrate respectively side and top views of a third embodiment of the exposure source unit. In this embodiment, housing 60 is formed of an illumination transmissive material, which may be clear acrylic plastic. The shape of housing 60 is substantially rectangular with the exception of face 62. Face 62 forms an angle b with bottom surface 64. This angle may be in the range of 40°–60°. The complement of angle b is the angle formed between surface 62 and back surface 66, and varies between 30° and 50°. A photographic density step wedge 68, which is located in the exposure plane, is positioned on bottom surface 64 of the housing, opposite surface as illustrated. A single flash lamp 69 is positioned in housing 60 at the opposite end of the housing from face 62. It has been imperically determined that the exposure source unit works best with flash lamp 69 positioned closer to the top of the housing.

The principle of operation of this embodiment will now be explained. A certain amount of radiation from lamp 69 directly encounters surface 62 and is internally reflected downward toward density wedge 68. As shown in FIG. 6, some rays illustrated at 70, 72 and 74 directly encounter surface 62 and are internally reflected toward density wedge 68. Each of these rays encounters surface 62 at an angle which is greater than the critical angle of reflectance for the material of which the housing is constructed. The critical angle of reflectance of clear acrylic plastic is roughly 42°. Other rays 76, near the top of the housing, encounter surface 62 at an angle less than the critical angle for the material, and pass out of exposure source unit. It may be seen that if only the direct rays 70, 72 and 74 were relied upon to illuminate element 68, then, because of the inverse square law which describes the fall-off of the intensity of illumination with distance, the central area 78 of element 68 would be illuminated much more than the peripheral areas 80 since the central area is closer to flash lamp 69. This embodiment however utilizes selective interior reflectance of light within the housing to reinforce the illumination at the peripheral areas 80 of the exposure plane formed by element 68. Illumination rays 82, 84 and 86 illustrate this principle. Illumination ray 82 encounters wall 90 at an angle greater than the critical angle, and is internally reflected toward the exposure plane to provide an increased amount of illumination at the peripheral area of the exposure plane. Illumination rays 84 and 86 pass from the exposure source unit because they encounter side wall 90 at angles which are less than the critical angle of reflectance of the material. Rays 92 and 94 reflect off back wall 66 and side wall 90 to provide an increased amount of illumination at the peripheral area 80 of the exposure plane. Ray 100, however, encounters side wall 90 at an angle which is less than the critical angle of reflectance of the material. Rays 98 and 99 encounter wall 66 at an angle which is less than critical angle c and pass from unit 60. In this manner, selective internal reflection of some illumination rays and selective transmittance of others combine to reinforce the amount of radiation received by the peripheral portions of the exposure plane. This provides substantially constant illumination over the entire area of the exposure plane.

In one embodiment which was successfully constructed the unit had the following approximate specifications: length (along bottom of side 90) — 3 ¼ inches; width — 4 ½ inches; thickness — 1 7/16 inches; angle *b* — 50°; material — clear acrylic plastic; center of hole 102 — centered in width and three-eighths inch from back surface; center of lamp 69 — five-sixteenths inch from top surface.

The envelope of lamp 69 may have varying degrees of magnification in different directions. To compensate for these varying degrees of magnification, either the hole 102, into which lamp 69 is inserted, or the surface of lamp 69 should diffuse the light entering block 60. This may be accomplished by etching either the surface of lamp 69 or the surface hole 102. Alternatively, or combined therewith, a cylindrical filter section 104 may be inserted around lamp 69 to vary either the intensity of the illumination or its spectral content.

While several embodiments have been described, the teachings of this invention will suggest other and different embodiments to those skilled in the art.

What is claimed is:

1. In a sensitometer which enables the determination of the response characteristics of a photosensitive medium to actinic radiation by exposing the photosensitive medium to actinic radiation, from an actinic energy source means, which has been modulated by an energy modulation means, and which includes an exposure source unit comprising said actinic energy source means, said energy modulation means, and means for providing a plurality of radiation paths from said actinic energy source means to said energy modulation means, the improvement comprising: said exposure source unit including an integrally constructed unit formed of a unitary plastic piece which encapsulates said actinic energy source means, said unitary plastic piece directing actinic radiation from said actinic energy source means to said energy modulation means only along a plurality of folded radiation paths, said integrally constructed unit precluding replacement of said actinic energy source means or said energy modulation means without effectively destroying the exposure source unit, and the external surfaces of said unitary plastic piece being dimpled and coated with a reflective material to form highly reflective and radiation scattering interior surfaces, thereby providing substantially uniform, indirect, scattered radiation to said energy modulation means.

2. Apparatus as set forth in claim 1 wherein said actinic energy source means is mounted at one end of said unitary plastic piece and said unitary plastic piece includes a first section with a relatively constant thickness and a width which increases as the distance from said actinic energy source means increases along the length of said first section, thereby providing said unitary plastic piece with a shape which diverges in a direction sway from said actinic energy source means.

3. Apparatus as set forth in claim 2 wherein said unitary plastic piece includes a second section adjoining said first section, said second section has a thickness equal to the thickness of said first section and a relatively constant width equal to the width of the widest part of said first section, and said second section includes an elbow bend along the length of said second section, whereby said elbow bend allows actinic radiation to be directed from said actinic energy source means to said energy modulation means only along a plurality of folded radiation paths, and whereby said constant width of said second section allows concentrated internal reflection of radiation near the ends of said energy modulation means to overcome the inverse square law and achieve substantially uniform indirect scattered radiation to said energy modulation means.

4. In a sensitometer which enables the determination of the response characteristics of a photosensitive medium to actinic radiation by exposing the photosensitive medium to actinic radiation from an actinic energy source means, which has been modulated by an energy modulation means, and which includes an exposure source unit comprising said actinic energy source means, said energy modulation means, and means for providing a plurality of radiation paths from said actinic energy source means to said energy modulation means, the improvement comprising:

a. said exposure source unit including a unitary housing means of light transmissive material;

b. said actinic energy source means being mounted adjacent a first face, said first face forming one end of said housing means;

c. said housing means having a second face which is disposed at a second end of said housing means, opposite said first end, and at an acute angle relative to said first face for producing substantial internal reflection therefrom; and d. said housing means having exterior surface means, including said first and second faces, for internally reflecting radiation incident upon said exterior surface means at angles greater than the critical angle of the light transmissive material, and for transmitting radiation from the housing means which is incident upon said exterior surface means at angles less than said critical angle, thereby resulting in the provision of substantially uniform radiation over the entire area of said energy modulation means.

5. Apparatus as set forth in claim 4 wherein said acute angle is in the range of 30° to 50°.

6. Apparatus as set forth in claim 4 wherein said housing means is made of clear plastic.

7. Apparatus as set forth in claim 4 wherein actinic energy source means includes a single flash lamp centrally located with respect to said first face.

8. Apparatus as set forth in claim 4 wherein said housing means has a substantially rectangular shape, except for said second face.

9. In a sensitometer which enables the determination of the response characteristics of a photosensitive medium to actinic radiation by exposing the photosensitive medium to actinic radiation, from an actinic energy source means, which has been modulated by an energy modulation means, and which includes an exposure source unit comprising said actinic energy source means, said energy modulation means, and means for providing a plurality of radiation paths from said actinic energy source means to said energy modulation means, the improvement comprising: said exposure source unit including an enclosure means for directing actinic radiation from said actinic energy source means to said energy modulation means only along a plurality of folded optical paths, said actinic energy source means being mounted at one end of said enclosure means and said enclosure means including a first section with a relatively constant thickness and a width which increases as the distance from said actinic energy source means increases along the length of said first section, thereby providing said enclosure means with a shape which diverges in a direction away from said actinic energy source means, and said enclosure means having interior surfaces which are highly reflective and radiation scattering, thereby providing substantially uniform indirect scattered actinic radiation to said energy modulation means, and said enclosure further including a second adjoining said first section, said second section having a thickness equal to the thickness of said first section and a relatively constant width equal to the width of the widest part of said first section, and said second section including an elbow bend along the length of said second section, whereby said elbow bend allows actinic radiation to be directed from said energy source means to said energy modulation means only along a plurality of folded radiation paths, whereby said constant width of said second section allows a concentrated internal reflection of radiation near the ends of said energy modulation means to overcome the inverse square law and achieve substantially uniform indirect scattered radiation to said energy modulation means.

10. Apparatus as set forth in claim 9 wherein said highly reflective surfaces include highly reflective dimpled surfaces to scatter incident actinic energy.

11. Apparatus as set forth in claim 10 wherein said actinic energy source means consists of a single flash lamp.

12. Apparatus as set forth in claim 11 wherein said interior surfaces are comprised of shot-peened, bright-dipped anodized aluminum.

13. Apparatus as set forth in claim 12 wherein said enclosure means includes absorption means, positioned adjacent to said energy modulation means, for absorbing actinic energy in the central region of said modulation means.

14. Apparatus as set forth in claim 13 wherein said absorption means includes a piece of shot-peened, etched, anodized aluminum.

15. Apparatus as set forth in claim 10 wherein said enclosure means includes absorption means, positioned adjacent to said energy modulation means, for absorbing actinic energy in the central region of said modulation means.

16. In a sensitometer which enables the determination of the response characteristics of a photosensitive medium to actinic radiation by exposing the photosensitive medium to actinic radiation, from an actinic energy source means, which has been modulated by an energy modulation means, and which includes an exposure source unit comprising said actinic energy source means, said energy modulation means, and means for providing a plurality of radiation paths from said actinic energy source means to said energy modulation means, the improvement comprising:

a. said exposure source unit including an enclosure means for directing actinic energy from said actinic energy source means to said energy modulation means only along a plurality of folded optical paths, said enclosure means having dimpled interior surfaces which are highly reflective and actinic energy scattering, thereby providing substantially uniform indirect scattered actinic energy to said energy modulation means in a very efficient manner;

b. said actinic energy source means consisting of a single flash lamp mounted at one end of said enclosure means, and said enclosure means including a first section with a relatively constant thickness and a width which increases as the distance from said actinic energy source means increases along the width of said first section, thereby providing said enclosure means with a shape which diverges in a direction away from said actinic energy source means; and c. said enclosure means further including a second section adjoining said first section, said second section having a thickness equal to the thickness of said first section and a relatively constant width equal to the width of the widest part of said first section, and said second section including an elbow bend along the length of said second section, whereby said elbow bend allows actinic radiation to be directed from said energy source means to said energy modulation means only along a plurality of folded radiation paths, and whereby said constant width of said second section allows a concentrated internal reflection of radiation near the ends of said energy modulation means to overcome the inverse square law and achieve substantially uniform indirect scattered radiation to said energy modulation means.

17. Apparatus as set forth in claim 16 wherein said interior surfaces are comprised of shot-peened, bright-dipped, anodized aluminum.

18. Apparatus as set forth in claim 17 wherein said enclosure means includes absorption means, positioned adjacent to said energy modulation means, for absorbing actinic energy in the central region of said modulation means.

19. Apparatus as set forth in claim 18 wherein said absorption means includes a piece of shot-peened, etched, anodized aluminum.

* * * * *